June 13, 1939.   J. S. BURNS ET AL   2,161,994
DISK CUTTER
Filed Feb. 11, 1936   2 Sheets-Sheet 1

INVENTORS.
John S. Burns & Arthur W. Emmons
BY Bodell & Thompson
ATTORNEYS.

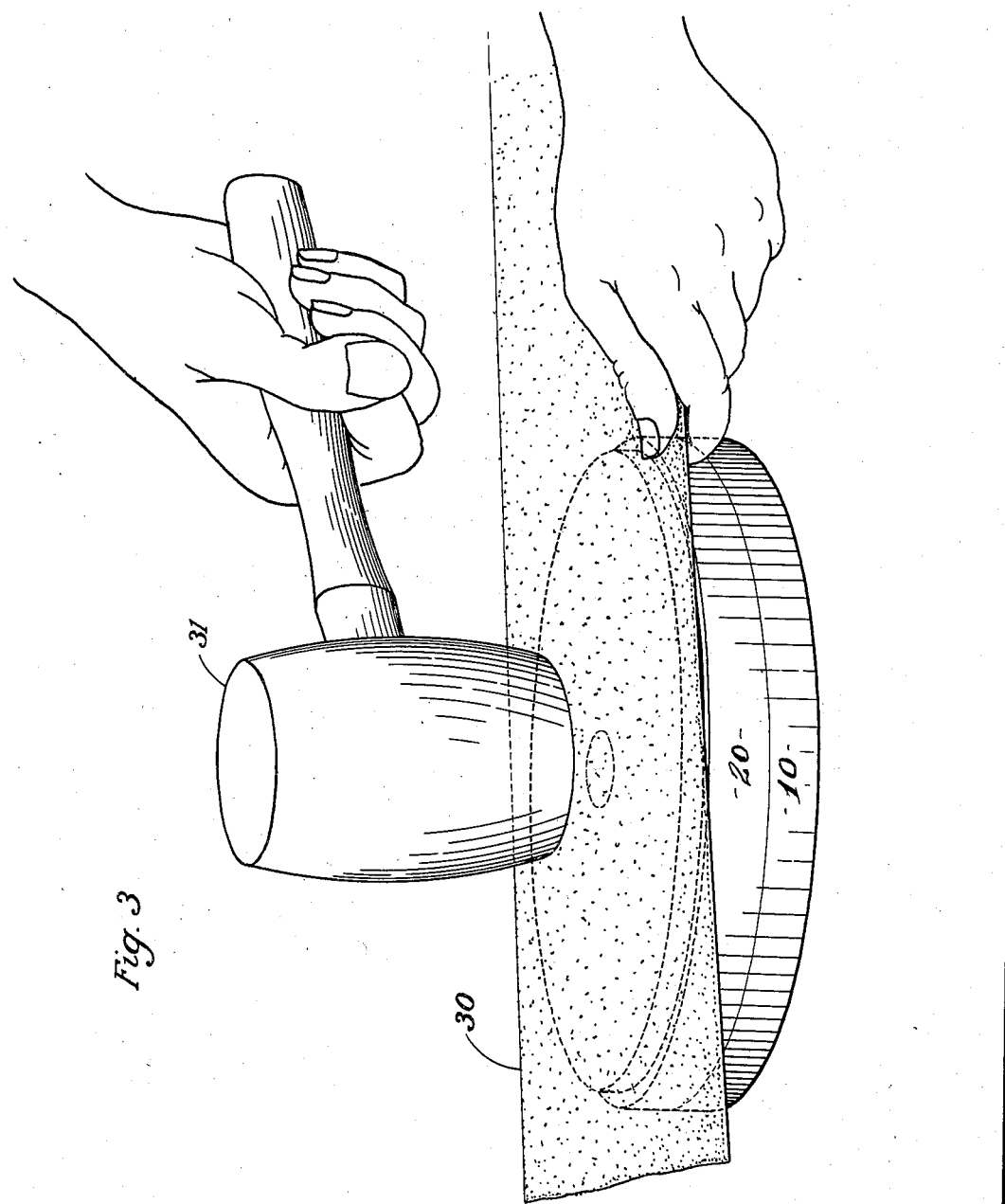

Patented June 13, 1939

2,161,994

UNITED STATES PATENT OFFICE 2,161,994

DISK CUTTER

John S. Burns, Detroit, Mich., and Arthur N. Emmons, Nedrow, N. Y., assignors to The Porter-Cable Machine Company Inc., Syracuse, N. Y., a corporation of New York Application February 11, 1936, Serial No. 63,392

4 Claims. (Cl. 164—32)

This invention relates to a device for cutting disks from sheet material.

The device is particularly adaptable for cutting disks from abrasive sheets, which disks are for use with what is known as disk grinders, or sanding machines.

The invention has as an object, a disk cutter of simple and economical construction which may be operated by anyone to cut a disk from sheet material.

The invention has as a further object, a disk cutter with provision for concentrically arranged cutting blades, and of such construction that the blades may be readily detached from the cutter and sharpened, or replaced.

The invention consists in the novel features and in the combinations and constructions hereinafter set forth and claimed.

In describing this invention, reference is had to the accompanying drawings in which like characters designate corresponding parts in all the views.

Figure 3 is a perspective view illustrating one manner in which the disk cutter may be used.

Figure 1:
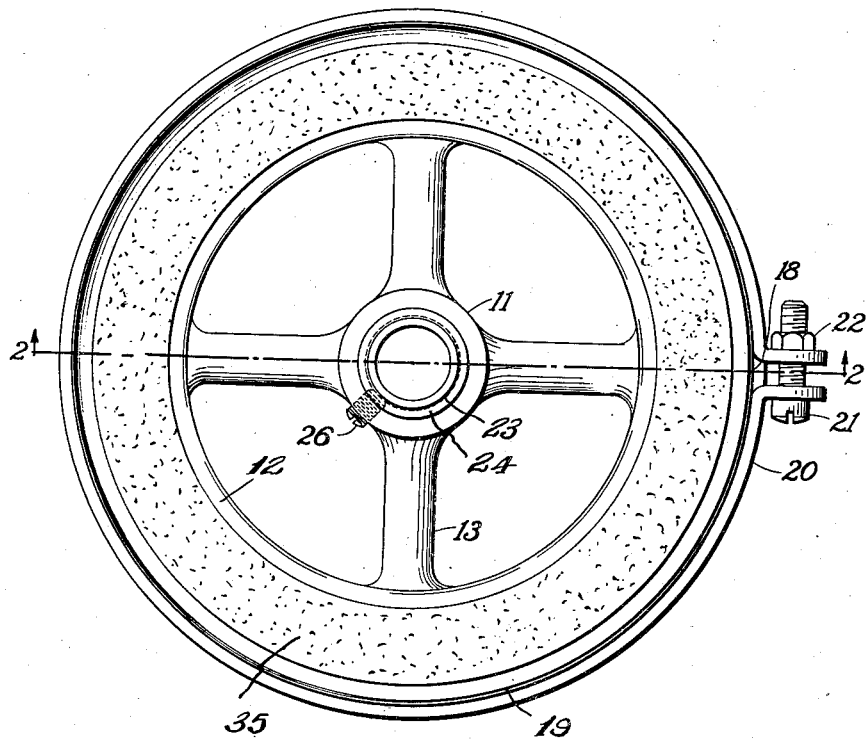
Figure 1 is a top plan view of the disk cutter.
Figure 2:
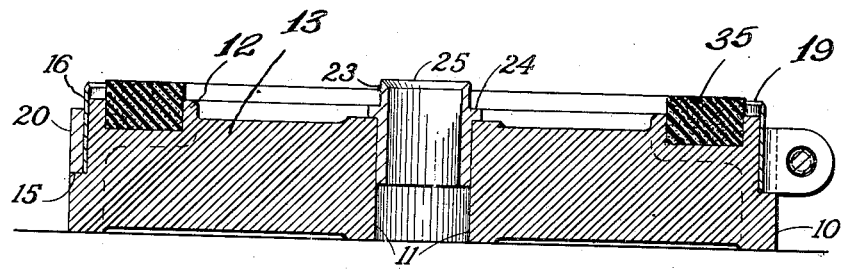
Figure 2 is a sectional view taken on lines 2—2, Figure 1.

10 designates a base which, as here shown, comprises a hub portion 11, a rim 12, and a plurality of radially extending arms or spokes 13. The base 10 is preferably formed of cast metal, and the lower edges of the hub and rim portions are machined on the same plane. The upper portion of the rim is of reduced diameter forming a shoulder 15.

16 designates a circular cutting blade which may be in the form of a continuous band, or severed, as at 18. The blade 16 encircles the upper portion of the rim 12, with the lower edge of the blade resting upon the shoulder 15, and the blade is of such width as to extend a short distance upwardly beyond the upper edge of the rim 12.

The upper edge of the blade 16 is tapered or sharpened to provide a cutting edge 19. The band or blade 16 may be secured to the rim of the base in any suitable manner. Preferably, so that it is detachable as by a band 20 encircling the blade, and whereby the severed ends of the band 20 are drawn together by a screw 21 which is provided with a lock nut 22.

Where it is desired to provide the disk with a central aperture, an additional cutter is arranged centrally of the base 10. As here shown, the hub portion 11 is bored to receive a circular cutter 23 which is formed with a radially outwardly extending flange 24 coacting with the upper face of the hub 11, and the upper end of the bushing or cutter 23 is provided with a sharpened cutting edge 25. The cutting edge 25 of the central cutter extends upwardly a short distance beyond the plane of the cutting edge 19 of the blade 16. The cutter 23 may be held in position by a set screw 26.

The device may be used, as illustrated in Figure 3, in which instance the sheet material 30 is placed over the cutting blades 16, 23, and the upper surface of the material over the central cutter 23 is tapped lightly, as by a wooden mallet 31. This action cuts a small circular portion from the center of the sheet 30, and permits the sheet to pass over the upper end of the central cutter 23. The central cutter 23 then acts as a guide or center for the sheet, and the sheet is then tapped directly over the outer circular cutter 16, until the disk is completely severed from the sheet. The severed disk is removed from the cutter by pressing it upwardly from beneath, access being between the spokes or arms 13.

In order to facilitate the ease and rapidity with which the device may be used, resilient means may be arranged adjacent the outer cutter 16. As here shown, the upper face of the rim 12 is provided with an annular recess or groove in which is mounted an annular member 35 formed of resilient material, such as sponge rubber. The resilient member 35 is so arranged, or positioned, that its upper face is normally in a plane slightly above the cutting edge 19 of the blade 16. When the disk has been completely severed from the strip, the resilient member 35 forces the disk upwardly in slightly spaced apart relationship from the blade 16, so that it may be readily removed from the device. The annular sponge rubber member 35 may be replaced with any suitable structure, such as a spring pressed plate.

The sheet material 30 may be sandpaper, or other abrasive material, and the severed disk is used on what is commonly known as a disk sander. It is usually desired to cut a small disk from the center of the larger disk to receive the fastening means of the sanding machine. However, in instances where the disk is secured to the face plate of the machine by adhesive, or the like, it is not necessary to remove the central portion of the disk, in which instance the central cutter 23 is removed from the base. The device may be also used by placing the sheet material upon a flat surface, such as a work-bench, and pressing the blades through the material.

It will be noted that our disk cutter, while extremely simple and economical in construction, is most convenient to operate and produces a true disk. Often the small power driven disk sander is used to finish the narrow border about floors, and the operator desires to cut the disk from the sheet material discarded from the large floor surfacing machine. With this disk cutter, the disk can be so cut on the job with a minimum loss of time to the operator.

What we claim is:

1. A disk cutter comprising a circular base formed with a peripheral shoulder, a cutter blade of thin, flexible material encircling the upper portion of said base, with the cutting edge of the blade extending upwardly from the face of the base, and the lower edge resting on said shoulder, an annular clamping member encircling said cutter blade below the cutting edge thereof and clamping the same against the periphery of the base, said base being formed with an aperture extending therethrough to permit removal of the severed disk.

2. A disk cutter comprising a base formed with a peripheral shoulder and a central aperture, a tubular cutter secured in said central aperture, a continuous edged cutter blade of thin, flexible material encircling the upper portion of the base, with the continuous cutting edge of the blade extending upwardly from the face of the base, a ring member encircling said cutter blade below the cutting edge thereof, and means for contracting said ring member to clamp the blade against the periphery of the base.

3. A disk cutter comprising a circular base formed with a peripheral shoulder, a cutter blade of thin, flexible material encircling the upper portion of said base, with the cutting edge of the blade extending upwardly from the face of the base, and the lower edge resting on said shoulder, an annular clamping member encircling said cutter blade below the cutting edge thereof and clamping the same against the periphery of the base, said base being formed with an aperture extending radially inwardly from the peripheral portion thereof and extending through said base.

4. A disk cutter comprising a base, a tubular cutter secured in said base centrally thereof and extending upwardly from the face of the base, a cutter blade of thin, flexible material arranged concentrically of said central cutter with the cutting edge of said blade extending upwardly from the face of the base, said base being formed with an aperture arranged intermediate said tubular cutter and said blade and extending through said base, and means for detachably securing said blade to the base.

JOHN S. BURNS.
ARTHUR N. EMMONS.